Sept 17, 1957 R. F. E. STEGEMAN 2,806,407
SPECTACLE FRAMES
Filed March 27, 1953
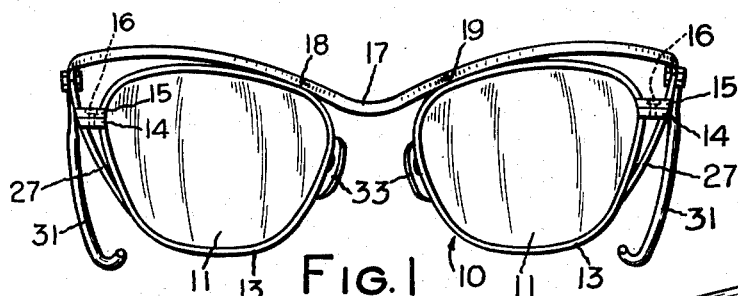
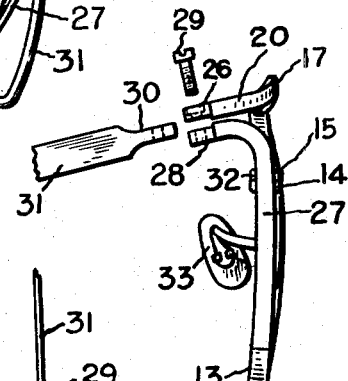
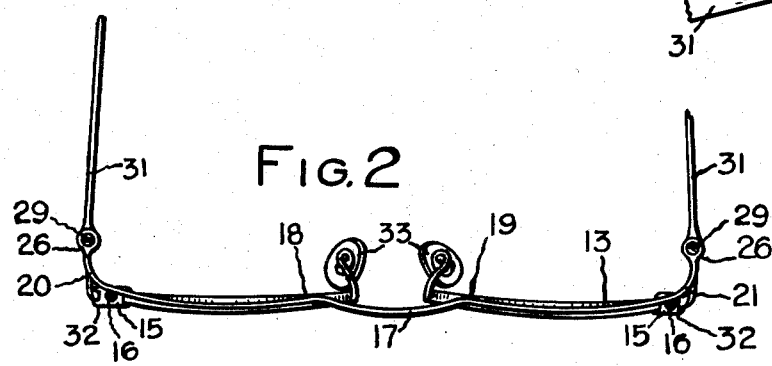
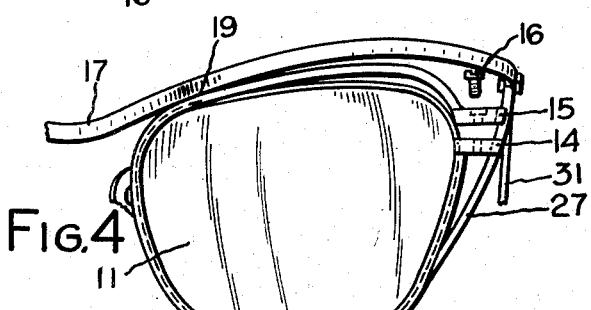
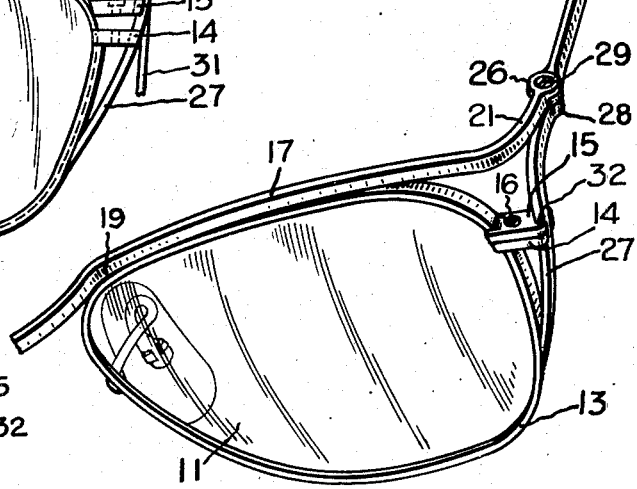
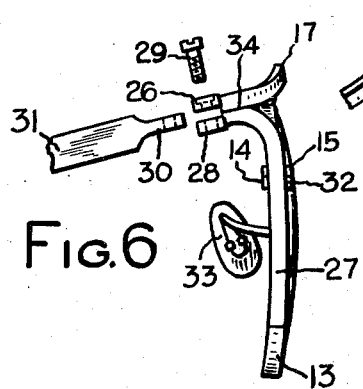
INVENTOR.
R. F. E. STEGEMAN
BY
ATTORNEY

United States Patent Office 2,806,407
Patented Sept. 17, 1957

2,806,407

SPECTACLE FRAMES

Raymond F. E. Stegeman, Greece, N. Y., assignor to Bausch & Lomb Optical Company, Rochester, N. Y., a corporation of New York Application March 27, 1953, Serial No. 345,179

3 Claims. (Cl. 88—41)

This invention relates to spectacles and more particularly it has reference to means for adjustably supporting temples and lenses on spectacle frames.

One of the objects of this invention is to provide a spectacle frame having improved means for adjustably supporting the lenses and temples thereon. A further object is to provide a spectacle frame in which the temples are supported so that adjustments may be readily made in order to position the temples in various positions relative to the lenses. Still another object is to provide a spectacle frame which will be relatively rigid in structure while still permitting necessary adjustments to be made in the relative positions of the temples and lenses. These and other objects and advantages reside in certain novel features of construction, arrangement and combination of parts as will hereinafter be more fully described and pointed out in the appended claims.

Referring to the drawings:

Fig. 1 shows a front elevational view of a spectacle frame embodying my invention.

Fig. 2 is a top plan view thereof, with the temples broken away.

Fig. 3 is a fragmentary perspective view of same on an enlarged scale.

Fig. 4 is a fragmentary view showing the parts separated for removal of the lens.

Fig. 5 is a fragmentary side view of the frame showing the temple parts in separated relation.

Fig. 6 is a fragmentary side view, similar to Fig. 5, but showing a modification.

A preferred embodiment of my invention is disclosed in the drawings wherein 10 indicates, generally, a spectacle frame having the spaced lenses 11 carried, respectively, by the surrounding metal lens rims 13 which have split ends at their temporal portions. Secured, respectively, to the split ends of rim 13 are the lugs 14 and 15 which are held together by screws 16 so that the lenses 11 are detachably held by the rims 13.

Extending along and above the tops of rims 13 and substantially in the planes thereof is the brow bar 17 which is soldered, respectively, at 18 and 19 to the top portions of the two spaced rims 13 adjacent the nasal portions thereof. The brow bar 17 extends outwardly substantially in the planes of and beyond the temporal portions of the lens rims and thence rearwardly and terminates in the respective end portions 20 and 21 which carry hinge parts 26.

Secured to the respective temporal sides of the lens rims 13 and below the lugs 14 and 15 are the brace bars 27 which extend upwardly in the planes of the rims, past the lugs and thence upwardly and rearwardly to points adjacent the end portions 20 and 21 of the brow bar 17. The respective ends of the brace bars 27 carry hinge parts 28 which are adapted to coact with the adjacent hinge parts 26 on the brow bar so as to pivotally receive, on screws 29, the flat joints 30 of temples 31. The brace bars and the brow bar are formed of a flexible, resilient material such as metal and, as shown in Fig. 5, the hinge parts 26 and 28 are normally spaced apart so that when the screw 29 draws them together it acts against the resilience of the brow bar and the brace bar and hence screw 29 is not apt to loosen. The outer ends of lugs 14 and 15 are provided with notches 32 to receive the brace bars 27. The lower lugs 14 are preferably soldered to the brace bars while the upper lugs 15 are adapted to move upwardly, as shown in Fig. 4, when the screws 16 are removed in order to permit removal and insertion of the lenses. The usual nose pads 33 are carried on arms which are soldered to the nasal sides of the lens rims.

In the modification shown in Fig. 6, the adjacent ends of the brow bar and brace bar are soldered at 34 so that the resilience of the brow bar and brace does not tend to keep the screw 29 from loosening, as is the case in the structure shown in Figs. 1–5.

From the foregoing, it will be apparent that I am able to attain the objects of my invention and provide a spectacle frame which is rigid in structure and yet permits various adjustments of the temples relative to the lenses. Such adjustments are especially facilitated by the provision of the long brow bar portions and the relatively rigidly held brace bar portions. Both brace bars and the brow bar lie substantially in the planes of the lens rims so that a neat and compact structure is afforded. The coaction of the brace bars with the notched lugs on the lens rims also insures a rigid construction so that the frame will be retained in adjustment. The lenses may be removed or inserted without disturbing the temples and the temples may likewise be removed without disturbing the lenses. Various modifications can obviously be made without departing from the spirit of my invention as pointed out in the appended claims.

I claim:

1. In a spectacle frame including a lens surrounded by a rim which is provided on its temporal side with split ends carrying laterally projecting lugs, the combination of a brace bar connected to the temporal side of the rim below the lugs, said brace bar extending upwardly in the plane of the rim and into connection with the outer ends of the lugs and thence upwardly and rearwardly, a brow bar connected to the upper portion of the rim adjacent the nasal portion and extending to the temporal side of the rim and thence rearwardly to a point adjacent the end portion of the brace bar, said brow bar being spaced above the rim and lying in the plane thereof, hinge means connected to the end portions of said bars and a temple pivotally carried by the hinge means.

2. In a spectacle frame, the combination of a split rim surrounding a lens, lugs carried by the respective ends of the split rim at the temporal side thereof, the outer ends of the lugs having notches formed therein, a brace bar connected to the temporal portion of the rim below the lugs and extending upwardly through the notches and thence rearwardly, a brow bar secured to the upper portion of the rim and extending laterally above the rim to the temporal side of the rim and thence rearwardly to a point adjacent the end of the brace bar, hinge parts carried by the respective ends of the bar and a temple pivotally mounted on the hinge parts.

3. In a spectacle frame, the combination of a split rim surrounding a lens, upper and lower lugs carried on the respective ends of the rim at the temporal side thereof, the outer ends of said lugs having notches formed therein, a brace bar having its lower end connected to the temporal side of the rim below the lugs, said brace bar extending upwardly in the plane of the rim and through the notches in the lugs and thence rearwardly, one of the lugs being secured to the brace bar, the other lug being movable relative to the brace bar whereby the ends of the split rim may be separated for removal of the lens, a brow bar connected to the rim at the upper nasal portion thereof and extending laterally to the temporal side of the rim and thence rearwardly to a point adjacent the end of the brace bar, said brow bar being spaced above the top of the rim and lying substantially in the plane thereof, hinge means connected to the adjacent ends of the bars and a temple pivotally mounted on the hinge means.

References Cited in the file of this patent

UNITED STATES PATENTS

| | | |
|---|---|---|
| 1,967,434 | Simonds | July 24, 1934 |
| 1,981,706 | Nerney | Nov. 20, 1934 |
| 2,234,027 | Splaine | Mar. 4, 1941 |
| 2,727,436 | Prince | Dec. 20, 1955 |

FOREIGN PATENTS

| | | |
|---|---|---|
| 476,520 | Italy | Dec. 15, 1952 |